(12) United States Patent
Landaeus

(10) Patent No.: US 8,171,612 B2
(45) Date of Patent: May 8, 2012

(54) DEVICE FOR STRETCHING AN ELASTICALLY EXPANDABLE BODY

(75) Inventor: Mårten Landaeus, Olofstorp (SE)

(73) Assignee: ABB Technology Ltd., Zürich (CH)

( * ) Notice: Subject to any disclaimer, the term of this patent is extended or adjusted under 35 U.S.C. 154(b) by 1016 days.

(21) Appl. No.: 11/885,561

(22) PCT Filed: Feb. 20, 2006

(86) PCT No.: PCT/SE2006/000232
§ 371 (c)(1),
(2), (4) Date: May 27, 2008

(87) PCT Pub. No.: WO2006/093453
PCT Pub. Date: Sep. 8, 2006

(65) Prior Publication Data
US 2008/0276442 A1 Nov. 13, 2008

(30) Foreign Application Priority Data
Mar. 4, 2005 (SE) ........................ 0500532

(51) Int. Cl.
*B25B 27/00* (2006.01)
*B23P 11/02* (2006.01)
(52) U.S. Cl. ........................ 29/450; 29/235
(58) Field of Classification Search .......... 29/450, 29/235, 280, 507, 282, 423
See application file for complete search history.

(56) References Cited

U.S. PATENT DOCUMENTS

| 4,506,430 A | 3/1985 | Guzay, Jr. |
| 5,419,030 A | 5/1995 | Szymberski |
| 6,049,960 A | 4/2000 | Pilling et al. |
| 6,401,321 B2 * | 6/2002 | Carey et al. ............ 29/450 |
| 6,472,600 B1 | 10/2002 | Osmani et al. |

FOREIGN PATENT DOCUMENTS

| DE | 474 991 C | 10/1929 |
| DE | 19826123 A1 | 8/1999 |
| WO | WO-89/00782 A1 | 1/1989 |
| WO | WO-94/29938 A1 | 12/1994 |
| WO | WO-02/07282 A1 | 1/2002 |

OTHER PUBLICATIONS

PCT/ISA/210—International Search Report—May 8, 2006.
PCT/IPEA/409—International Preliminary Report on Patentability—Feb. 22, 2007.
Supplementary European Search Report, dated Jun. 30, 2011, issued in connection with counterpart European Patent Application No. EP 06 71 6922.

* cited by examiner

*Primary Examiner* — John C Hong
(74) *Attorney, Agent, or Firm* — Venable LLP; Eric J. Franklin

(57) ABSTRACT

A device for stretching an elastically expandable body, wherein the device includes a stiff tube over which at least part of the elastically expandable body is arranged to be applied when being stretched. The device includes at least one sliding element designed to be located in at least that end of the body where the application of the tube starts, to facilitate the application of the body onto the tube.

12 Claims, 4 Drawing Sheets

DEVICE FOR STRETCHING AN ELASTICALLY EXPANDABLE BODY

CROSS-REFERENCE TO RELATED APPLICATIONS

This application claims priority to Swedish patent application 0500532-7 filed 4 Mar. 2005 and is the national phase under 35 U.S.C. §371 of PCT/SE2006/000232 filed 20 Feb. 2006.

TECHNICAL FIELD

The present invention relates to a device for stretching an elastically expandable body for mounting over at least one cable core.

BACKGROUND ART

In the following, medium-voltage cables refer to cables that are used in the voltage range of 12-36 kV, and high-voltage cables refer to cables that are used in the voltage range exceeding 36 kV.

When jointing cable, the conductors from two cable ends are joined together with a jointing sleeve after the respective conductor has first been exposed from the surrounding insulation. The joint with the jointing sleeve must then be insulated. This insulation is usually carried out with a pre-fabricated jointing body of rubber. Known jointing bodies are usually formed with a substantially cylinder-shaped shell. The actual jointing body is provided with a continuous cylindrical hole, where the hole in the natural, non-stretched, state has an inner diameter that is somewhat smaller than the outer diameter of the insulation on the cable to be jointed. This is necessary for the elastic jointing body after the jointing to embrace the insulation of the cable ends for the purpose of obtaining a close-fitting joint.

When jointing is to be carried out, the work is initiated by placing the jointing body in a rest position over one of the cable cores. The cable ends are prepared by exposing the conductor cores from the insulation and joining the conductor ends together. The joining is usually carried out with a jointing sleeve which by means of mechanical deformation brings the sleeve into contact with the conductors. Thereafter, the jointing body is brought to a centred position over the jointing sleeve.

Elastically expandable adapters are used to adapt a cable joint or a stress cone, with an inner diameter adapted to a certain cable diameter, to a cable with a smaller cable diameter. By using adapters, a cable joint or a stress cone may be used for a plurality of different cable diameters. A stress cone is used in a cable joint or a cable termination.

Moving a jointing body over a cable without first stretching the jointing body is difficult and allows the jointing body to be used only on a cable with a well-defined outer diameter that is adapted to the size of the jointing body. It is therefore common for the jointing body to be stretched onto a tube before the jointing body is brought into place, first over one cable core and thereafter over the joint with a jointing sleeve.

It is known to stretch the jointing body onto a thin tube even at the factory. The jointing body with the tube then has an inner diameter that is larger than both the outer diameter of the cable that is jointed and a possible jointing sleeve in the joint, whereupon the jointing body may be easily fitted onto the cable according to the above. It is also known, when jointing power cables in the field, to stretch the jointing body onto a tube in connection with the jointing to be carried out.

Irrespective of where the stretching of the jointing body occurs, there is a need to facilitate the application of an elastically expandable body onto a stiff tube.

SUMMARY OF THE INVENTION

The object of the invention is to provide a device for use in connection with application of an elastically expandable body over a stiff tube, which is simple to handle and facilitates the application of the body over the tube.

This object is achieved in that a device that includes at least one sliding element designed to be located in at least that end of the body where the application of the tube begins in order to facilitate application of the body onto the tube.

According to one embodiment of the invention, the device comprises at least two sliding elements which are designed so as to form between themselves channels in the longitudinal direction of the body for transporting lubricant between the outside of the tube and the inside of the body.

According to one embodiment of the invention, the device comprises at least three of said sliding elements.

According to another embodiment of the invention, the number of sliding elements is in the interval of 2-10, preferably in the interval of 4-6. The number of sliding elements is dependent, among other things, on the tube in question and on the dimension of the sliding elements.

According to one embodiment of the invention, the sliding element comprises one sliding section, which comprises a sliding surface adapted to make sliding contact with the outside of the tube during the application of the body onto the tube, and one holder section designed to hold the sliding element in place in the body during the application of the body onto the tube.

According to one embodiment of the invention, the sliding section and the holder section are arranged at an angle $\alpha$ to each other, the angle $\alpha$ being in the interval of 60-100°, preferably in the interval of 70-90°.

According to one embodiment of the invention, the holder section comprises a handle to facilitate removal of the sliding element after the body has been applied onto the tube.

According to one embodiment of the invention, the sliding surface comprises at least one recess adapted for transport of lubricant between the outside of the tube and the sliding element. The recess is arranged substantially in the longitudinal direction of the sliding surface, that is, in the direction in which the tube slides against the sliding surface when the body is being applied onto the tube. By arranging recesses for transporting lubricant in the sliding surface, further channels are formed where lubricant may be transported in the elastically expandable body.

According to one embodiment of the invention, the holder section comprises an attachment element to secure that the holder section is kept in place in the body.

According to one embodiment of the invention, the device comprises a tapering body adapted to be applied between the body and the tube, with its narrowest end towards the body to facilitate application of the body to the tube.

According to one embodiment of the invention, the device comprises a supporting member for supporting the body when the body is being applied to the tube.

According to one embodiment of the invention, the device comprises means for acting with an axial force (F) on one end of the tube so that the body is applied to the tube at the other end of the tube.

When applying the body onto the tube, lubricant is arranged on the outside of the tube before applying the body onto the tube. Also the inside of the body is coated with lubricant. The lubricant reduces the friction between the outside of the tube and the inside of the body when the jointing body is being applied to the tube.

According to another embodiment of the invention, the elastically expandable body comprises any of the following: a jointing body, a stress cone, or an adapter.

According to still another embodiment of the invention, the sliding element is made of a polymer such as, for example, polyethylene or polyamide.

The invention also relates to use of a device when applying an elastically expandable body onto a stiff tube for mounting the body over at least one cable core of a cable for medium or high voltage.

The invention also relates to use of a device when applying an elastically expandable jointing body onto a stiff tube for mounting the body over the site of a joint between two cables for medium or high voltage.

The invention also relates to use of a device when applying an elastically expandable stress cone onto a stiff tube for mounting the stress cone at a cable termination or the site of a joint between two cables for medium or high voltage.

One advantage of the invention is that the device entails a simple way of facilitating the application of an elastically expandable body onto a stiff tube, where the outer diameter of the tube is larger than the inner diameter of the body in a stress-relieved state. The design of the sliding element allows lubricant to be transported a certain distance into the opening of the body, thus reducing the friction between the outside of the tube and the inside of the body while applying the body onto the tube, hence facilitating the application. Another advantage is that as the body is being applied to the tube, and the opening of the body towards the tube is hence stretched, additional sliding elements may be arranged in the opening of the body and thus form further channels for transporting lubricant.

BRIEF DESCRIPTION OF THE DRAWINGS

The invention will be explained in greater detail by description of an embodiment with reference to the accompanying drawing, wherein FIG. 1 schematically shows the location of sliding elements when applying an elastic body onto a stiff tube.

DESCRIPTION OF PREFERRED EMBODIMENTS

Figure 1:
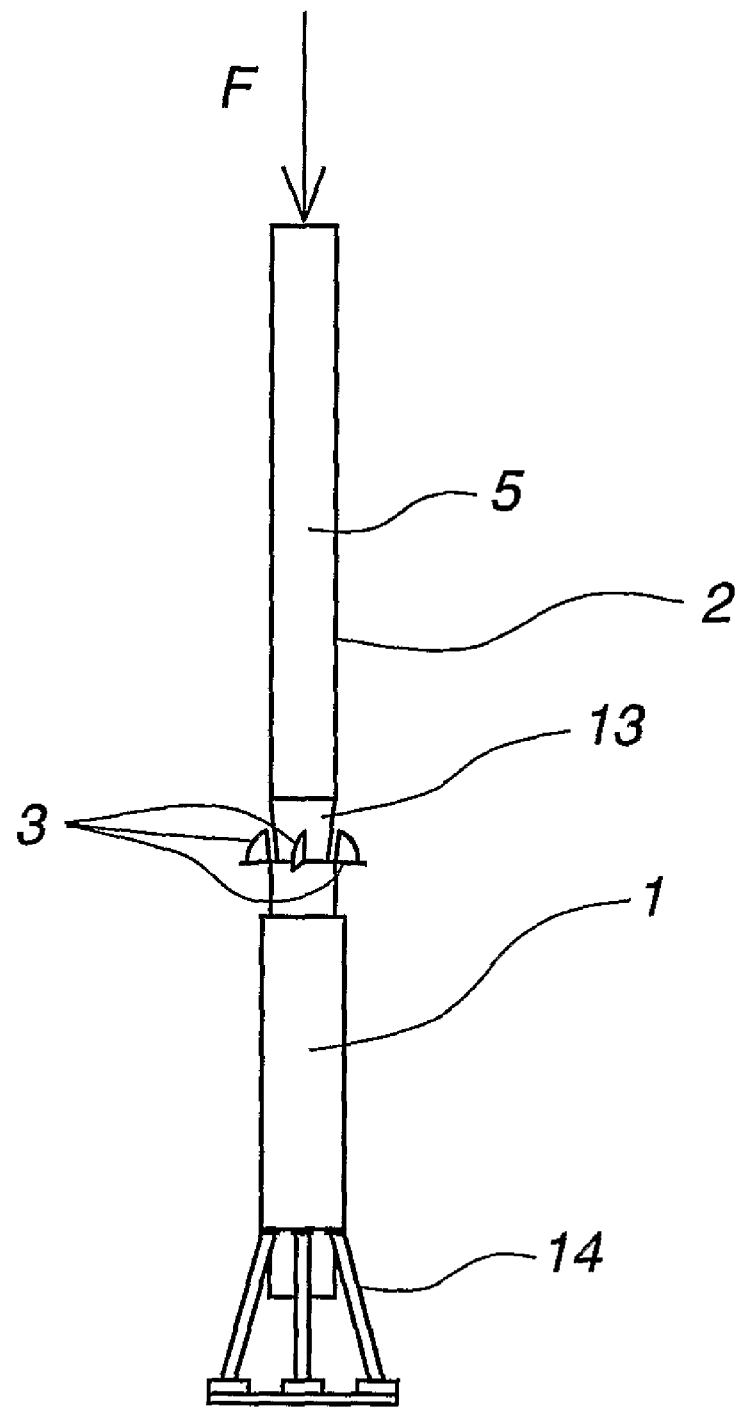

FIG. 1 shows how an elastically expandable jointing body 1 is stretched onto a stiff tube 2 prior to mounting of the jointing body on a joint between two cable cores. Prior to stretching, the jointing body has an inner diameter that is smaller than the outer diameter of the tube. The jointing body and the tube are placed against a support member 14. A tool (not shown) acts on the tube with a force F so that the jointing body is applied to the tube. To facilitate the application, a tapering body 13, adapted to be applied between the jointing body 1 and the tube 2, is placed with its narrowest end towards the jointing body 1. Before the tool is activated and the application starts, the outside 5 of the tube, the outside of the tapering body 13, and the inside 6 of the jointing body are coated with a lubricant to reduce the friction between the jointing body and the tube and hence facilitate the application of the jointing body to the tube. To further facilitate the application of the jointing body 1 to the tube 2, four sliding elements, three of which are shown in FIG. 1, are placed in that end of the jointing body 2 that faces the tube 3.

Figure 2:
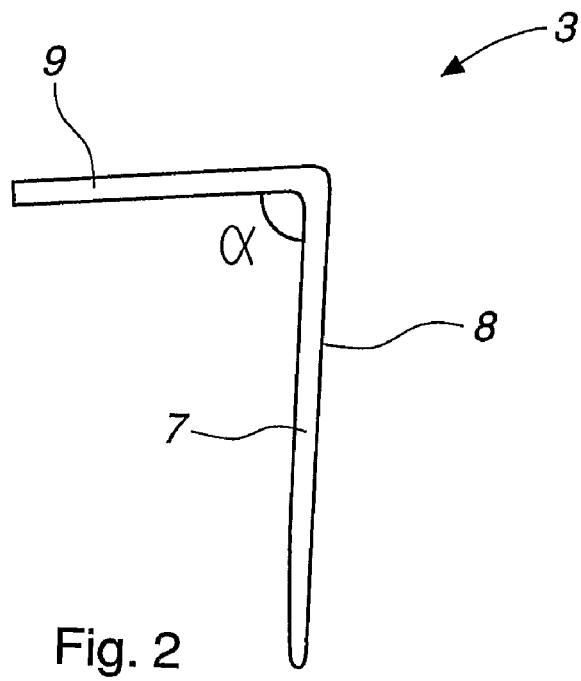
FIG. 2 schematically shows a sliding element to facilitate application of the jointing body to the tube.

FIGS. 2-6 show various examples of how the sliding element 3 may be designed. FIG. 2 shows the design of a sliding element 3 comprising a sliding section 7 with a sliding surface 8 adapted to make sliding contact with the outside 5 of the tube when the jointing body 1 is being applied to the tube 2. The sliding element 3 also comprises a holder section 9 designed to hold the sliding element 3 in place in the opening of the jointing body 1 when the tube 2 is being inserted into the jointing body 1. To keep the sliding element 3 in place at the opening of the jointing body, the sliding section 7 and the holder section 9 are arranged at an angle α to each other, the angle α being in the interval of 60-100°, preferably in the interval of 70-90°.

Figure 3:
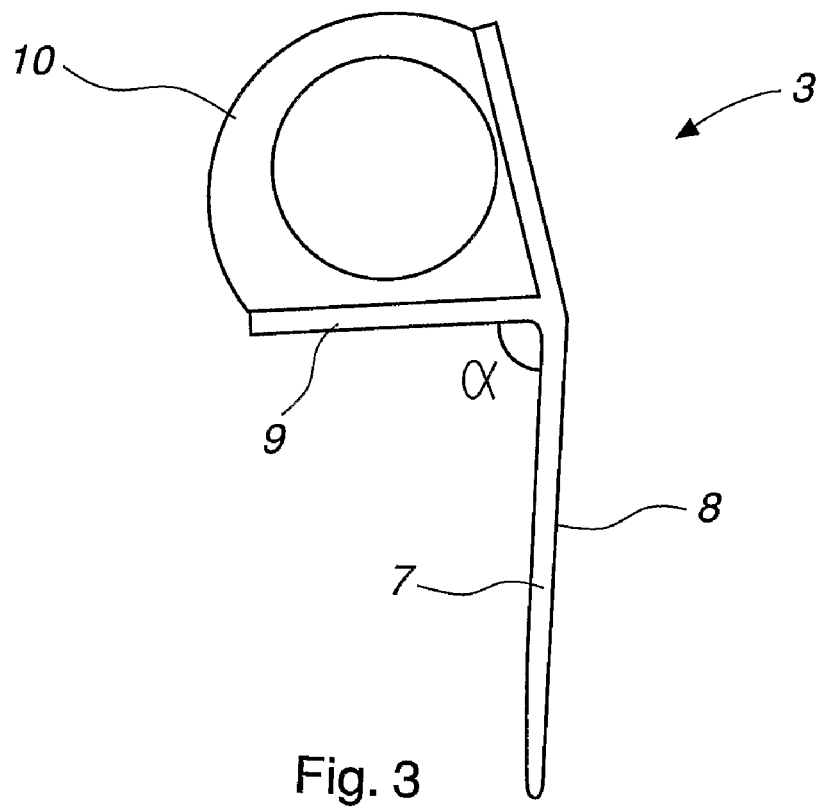
FIG. 3 schematically shows an alternative embodiment of the sliding element of FIG. 2.
Figure 4:
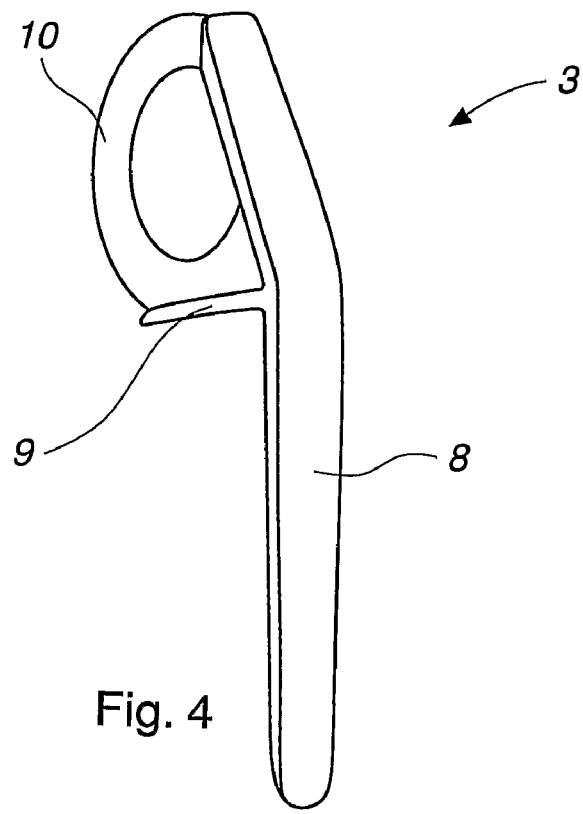
FIG. 4 shows a perspective view of the sliding surface of a sliding element according to FIG. 3.

FIG. 3 shows an alternative embodiment of the sliding element 3 of FIG. 2. In addition to the features described for FIG. 2, the holder section 9 also comprises a handle 10 to facilitate the removal of the sliding element 3 after the jointing body 1 has been applied onto the tube 2. FIG. 4 shows a perspective view of the sliding surface of a sliding element according to FIG. 3 to clarify the propagation of the sliding surface.

Figure 5:
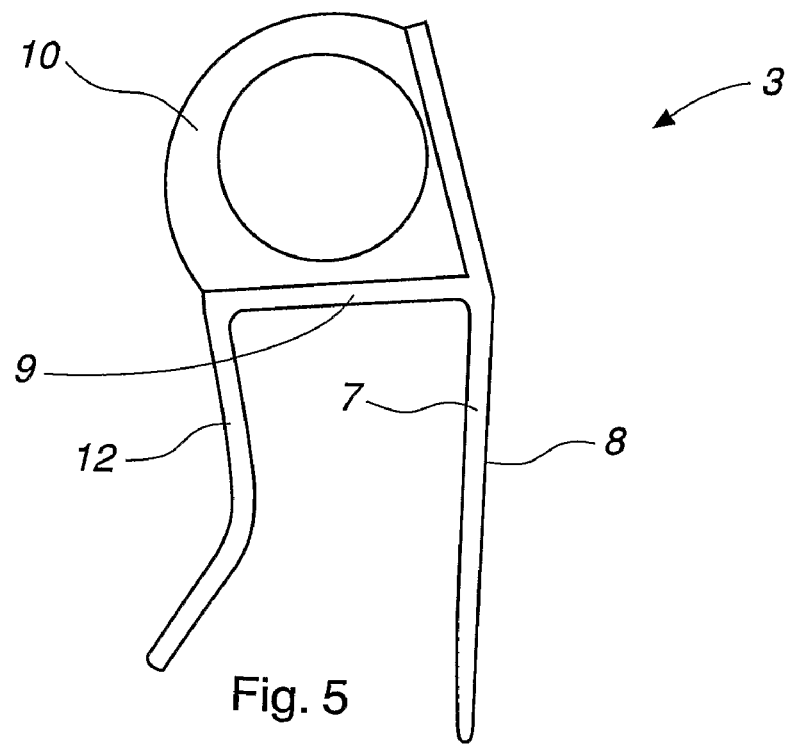
FIG. 5 shows another alternative embodiment of the sliding element of FIG. 2.

FIG. 5 shows an additional alternative embodiment of the sliding element 3 of FIGS. 2 and 3. In addition to the features described for FIG. 3, the holder section 9 comprises an attachment element to ensure that the sliding element 3 is kept in place at the opening of the jointing body 1. The attachment element 12 of FIG. 5 is arranged in the form of a resilient member acting on the jointing body 1.

Figure 6:
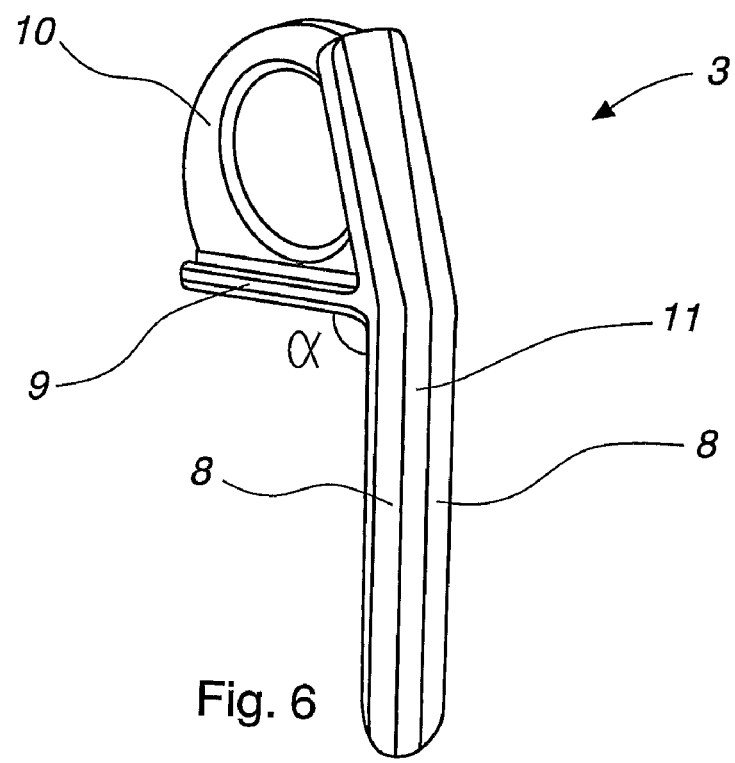
FIG. 6 shows a sliding element with a recess for transporting lubricant on the outside of the tube and into the body.

FIG. 6 shows a sliding element 3 with a sliding surface 8 comprising at least one recess adapted for transport of lubricant between the outside 5 of the tube and the sliding element 3. The recess 11 is arranged substantially in the longitudinal direction of the sliding surface, that is, in the direction in which the tube slides towards the sliding surface when the body is being applied to the tube.

Figure 7:
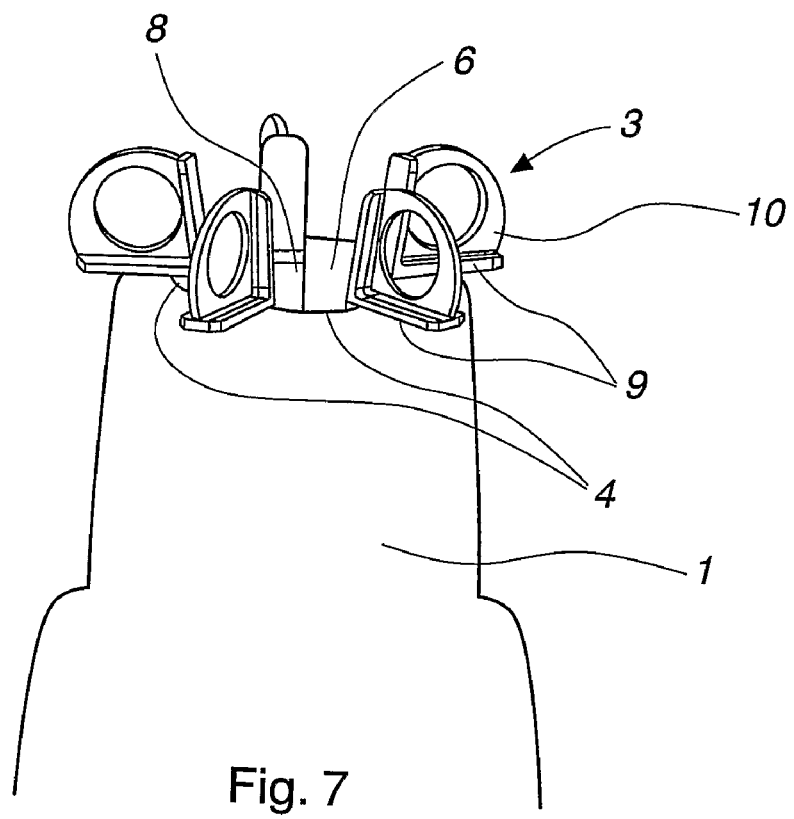
FIG. 7 shows a perspective view of a jointing body with four sliding elements prior to application of the jointing body to the tube.

FIG. 7 shows how five sliding elements 3 are placed in the opening of the jointing body 1 before the jointing body 1 is applied to the tube 2. Between the sliding elements, channels 4 are formed in the longitudinal direction of the jointing body 1 for transport of lubricant between the outside 5 of the tube and the inside 6 of the jointing body. The sliding elements in FIG. 5 comprise a sliding section 7 with a sliding surface 8 adapted to make sliding contact with the outside 5 of the tube when the jointing body 1 is being applied to the tube 2. The sliding element 3 also comprises a holder section 9 designed to hold the sliding element 3 in place in the jointing body 2 when the tube 3 is being inserted into the jointing body 2. The holder section 9 also comprises a handle 10 to facilitate removal of the sliding element 3 after the jointing body 1 has been applied to the tube 2.

The sliding element is preferably made of a polymer such as, for example, polyethylene or polyamide.

The invention is not limited to the embodiments shown above, but the person skilled in the art may, of course, modify them in a plurality of ways within the scope of the invention as defined by the claims. Thus, the invention is not limited to stretching of jointing bodies, but may also be applied to stretching of stress cones or adapters. Stress cones are used, for example, for a cable termination or at a joint between two cable cores. Adapters are used to adapt a cable joint or a stress cone, with an inner diameter adapted to a certain cable diameter, to a cable with a smaller cable diameter. By using adapters, a cable joint or a stress cone may be used for a plurality of different cable diameters.

The invention claimed is:

1. A device for stretching an elastically expandable body, comprising:
   a stiff tube over which at least part of the elastically expandable body is arranged to be applied when being stretched, and
   at least two separate sliding elements each configured to be placed in at least an end of the body where the application of the tube begins in order to facilitate the application of the body onto the tube, wherein the sliding elements are configured to form between themselves along their lengths channels in a longitudinal direction of the body for transport of lubricant between the outside of the tube and the inside of the body, wherein each sliding element comprises a sliding section comprising at least one sliding surface adapted to make sliding contact with the outside of the tube when the body is being applied to the tube, and a holder section configured to hold the sliding element in place in the body when the tube is being inserted into the body, and wherein the sliding section and the holder section are arranged at an angle $\alpha$ to each other, the angle $\alpha$ being in the interval of 60-100°.

2. The device according to claim 1, wherein the device comprises at least three of said sliding elements.

3. The device according to claim 1, wherein the holder section comprises a handle to facilitate a removal of the sliding element after the body has been applied onto the tube.

4. The device according to claim 3, wherein the sliding surface comprises at least one recess adapted for transport of lubricant between the outside of the tube and the inside of the body, mainly in the longitudinal direction of the body.

5. The device according to claim 1, wherein the holder section comprises an attachment element to ensure that the holder section is kept in place in the body.

6. The device according to claim 1, further comprising:
   a tapering body adapted to be applied between the body and the tube, with its narrowest end towards the body to facilitate the application of the body onto the tube.

7. The device according to claim 1, further comprising:
   a supporting member to support the body when it is applied onto the tube.

8. The device according to claim 1, wherein the elastically expandable body comprises any of the following: a jointing body, a stress cone, or an adapter.

9. The device according to claim 1, wherein the stiff tube comprises at least one cable core of a cable.

10. The device according to claim 1, wherein the body comprises a jointing body for jointing two cable cores.

11. The device according to claim 1, wherein the body comprises a stress cone for jointing two cable cores or at a termination of a cable core.

12. The device according to claim 1, wherein the angle $\alpha$ is in the interval of 70-90°.

* * * * *